July 8, 1924.

O. ENAX ET AL 1,500,489

AUTOMOBILE TRAFFIC SIGNAL

Filed Jan. 24, 1924

Inventors
Otto Enax.
Roy D. Zibk.

By A. J. O'Brien

Attorney

Patented July 8, 1924.

1,500,489

UNITED STATES PATENT OFFICE.

OTTO ENAX AND ROY D. ZILK, OF DENVER, COLORADO.

AUTOMOBILE TRAFFIC SIGNAL.

Application filed January 24, 1924. Serial No. 688,187.

*To all whom it may concern:*

Be it known that we, OTTO ENAX and ROY D. ZILK, citizens of the United States, residing at Denver, in the city and county of Denver and State of Colorado, have invented certain new and useful Improvements in Automobile Traffic Signals; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to traffic signals to be used in connection with automotive vehicles.

It is well known to all that since the automobiles have become so numerous, accidents can be prevented only by the use of great care. Since the density of our automobile traffic has become so great that the automobiles form a continuous procession, it is imperative that each driver shall, by an appropriate signal, apprise the driver of the following car of his intention to stop or to turn. It is customary for drivers to employ their left arm as a signal by extending the same to the left, but when closed cars are used and in winter or during stormy weather when side curtains are in place, it is often impossible to signal in this way, with the result that many serious accidents occur.

It is the object of this invention to produce a simple and substantial signal device that can be readily applied to any type of car or truck, and which can be conveniently operated from the inside of the car.

Our invention, briefly described, consists of a signal member, preferably having the outline of a hand, which is mounted for rotation about a vertical axis. This member is secured to the outside of the car and provided with means projecting into the car for moving the member about its axis.

In order better and more clearly to describe our invention, we shall have reference to the accompanying drawing in which the present preferred embodiment thereof is shown, and in which.

Numeral 1 indicates a vertical piece of the framework of an automobile body to the outside of which our improved signal is secured.

Figure 1:
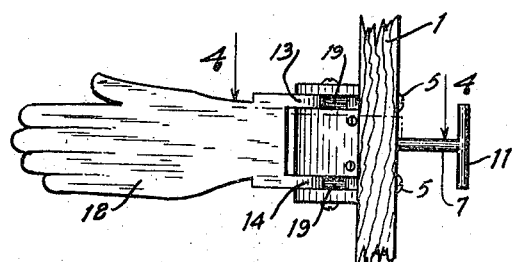
Fig. 1 is a side elevation of our improved signal showing the same secured to an upright portion of the automobile body and in signaling position.
Figure 2:
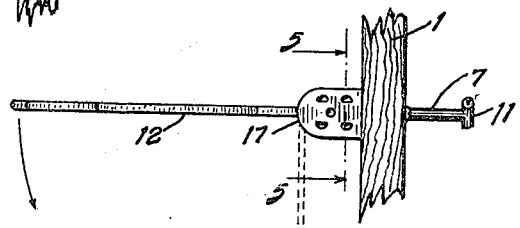
Fig. 2 is a top plan view of the signal shown in Fig. 1, the dotted line position indicating the inoperative position of the signal.
Figure 3:
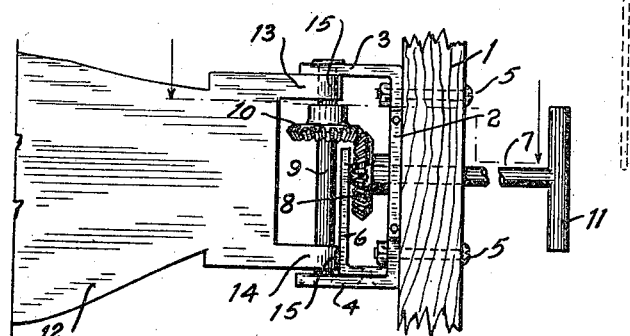
Fig. 3 is a view similar to that in Fig. 1, but with the enclosing casing or cover removed.
Figure 4:
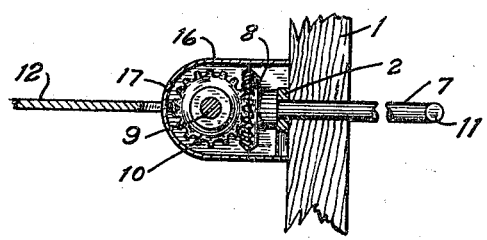
Fig. 4 is a section taken on line 4—4, Fig. 1.
Figure 5:
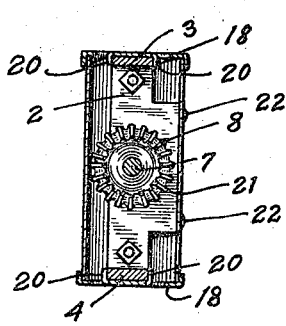
Fig. 5 is a section taken on line 5—5, Fig. 2.

Our signal consists of a U-shaped bracket having a straight portion 2 and two parallel end portions 3 and 4. The part 2 is provided with a pair of openings for the reception of bolts 5, by means of which the bracket is secured in place. Secured to the lower end portion 4 is an L-shaped bracket member 6. A rod 7 extends through an opening in the frame 1 and through corresponding openings in part 2 and bracket 6. A bevel gear 8 is non-rotatably secured to rod 7 at a point between parts 6 and 2 in the manner shown in Fig. 3. A shaft 9 is rotatably mounted near the ends of arms 3 and 4 and has secured thereto a bevel gear 10 which is in operative relation to the gear 8. The rod 7 has a handle 11 secured thereto and by means of which it can be rotated. Secured to the vertical shaft 9 is a signal member 12 whose inner end terminates in spaced parallel arms 13 and 14 that are provided with bent portions 15 which embrace the shaft 9 and may be soldered thereto or clamped against rotation by any other means, such as set screws. Member 12 may be of any shape, but is preferably cut into the shape of the silhouette of an extended hand. It is evident that by rotating the rod 7 and the shaft 9, the signal member that is attached thereto is also rotated, and by this means, the position of the signal can readily be controlled from the inside of the car through the instrumentality of the rod 7 and gears 8 and 10.

For the purpose of improving the appearance of the signal, it is desirable to enclose the gears and shafts in a suitable casing. We have therefore provided a cover or casing having two parallel spaced side portions 16 connected by an arcuate portion 17. Ends 18 close the ends of the casing. The distance between the inside of the end portions is the same as the distance between the outer surfaces of the arms 3 and 4, while the distance between the sides 16 is slightly greater than the diameter of the gear wheels. One side 16 has slots 19 which permit the arms 13 and 14 to move therein. The ends 18 have portions cut from the material thereof and bent at right angles thereto for the purpose of forming guiding tongues 20 that embrace the sides of arms 3 and 4. The part 2 has on one side thereof a projecting portion 21, to which the casing is secured by means of screws 22. That surface of the signal that is to the outside when it is inoperative, is painted the same color as the automobile body so that it will be as inconspicuous as possible when in inoperative position. The other side may be painted any color desired, preferably white or red. For use at night it may be necessary to provide a lamp at some position where it will illuminate the rear surface of the signal. We have not shown the lamp, as it forms no part of our invention.

We want to call particular attention to the manner in which the casing is constructed and applied, as this is an important part of the invention.

From the above, it will be apparent that we have produced a signal device that is extremely simple and reliable in its operation, and which can be cheaply made. Our signal can be readily installed, as it requires only a single hole to be bored in the frame of the automobile.

Having now described our invention, what we claim as new is:

1. In an automobile traffic signal, in combination, a U-shaped frame bracket having a substantially straight central portion with the end portions bent at right angles thereto, a shaft rotatably mounted in said end portions, a signal member secured to said shaft, said member having two spaced arms, the ends of which are non-rotatably secured to the shaft, a bevel gear also secured to said shaft between said arms, a bar rotatably mounted in the base of said bracket, a bevel gear on said bar, said gear meshing with the gear on the shaft, and a casing for enclosing said shaft and gears, said casing having guiding lugs for engaging the side of the end portions of the bracket.

2. In an automobile traffic signal, in combination, a U-shaped frame bracket having a substantially straight central portion with the end portions bent at right angles thereto, a shaft rotatably mounted in said end portions, a signal member secured to said shaft, said member having two spaced arms, the ends of which are non-rotatably secured to the shaft, a bevel gear also secured to said shaft between said arms, a bar rotatably mounted in the base of said bracket, a bevel gear on said bar, said gear meshing with the gear on the shaft, a casing for enclosing said shaft and gears, said casing having guiding lugs for engaging the side of the end portions of the bracket, said casing also having transverse slots for the reception of the spaced arms of the signal member, and means for securing the casing to the bracket.

In testimony whereof they affix their signatures.

OTTO ENAX.
ROY D. ZILK.